(12) United States Patent
Abbondanzio

(10) Patent No.: US 10,304,358 B1
(45) Date of Patent: May 28, 2019

(54) SYSTEM FOR DISPLAYING CONTIGUOUS, ULTRA-WIDE, DIGITAL INFORMATION IN AUTOMATED TRANSPORTATION SYSTEMS

(71) Applicant: David Abbondanzio, Dallas, TX (US)

(72) Inventor: David Abbondanzio, Dallas, TX (US)

( * ) Notice: Subject to any disclaimer, the term of this patent is extended or adjusted under 35 U.S.C. 154(b) by 0 days.

(21) Appl. No.: 15/803,651

(22) Filed: Nov. 3, 2017

Related U.S. Application Data

(60) Provisional application No. 62/417,105, filed on Nov. 3, 2016.

(51) Int. Cl.

| | |
|---|---|
| *G09F 9/33* | (2006.01) |
| *G09F 21/04* | (2006.01) |
| *G09F 9/35* | (2006.01) |
| *G09F 27/00* | (2006.01) |
| *G09G 3/20* | (2006.01) |
| *G09G 3/34* | (2006.01) |
| *G06K 9/00* | (2006.01) |
| *G06T 7/60* | (2017.01) |
| *G09G 3/36* | (2006.01) |
| *G09G 3/3208* | (2016.01) |

(52) U.S. Cl.
CPC .............. *G09F 9/33* (2013.01); *G09F 9/35* (2013.01); *G09F 21/04* (2013.01); *G09F 27/00* (2013.01); *G09G 3/2096* (2013.01); *G06K 9/00228* (2013.01); *G06T 7/60* (2013.01); *G06T 2207/30201* (2013.01); *G06T 2207/30242* (2013.01); *G09G 3/3208* (2013.01); *G09G 3/3453* (2013.01); *G09G 3/36* (2013.01); *G09G 2370/02* (2013.01); *G09G 2370/16* (2013.01); *G09G 2380/06* (2013.01)

(58) Field of Classification Search
CPC ... G09F 9/33; G09F 9/35; G09F 21/04; G09F 27/00; G09G 3/2096; G09G 3/3208; G09G 3/3453; G09G 3/36; G09G 2370/02; G09G 2370/16; G09G 2380/06; G06K 9/00228; G06T 7/60; G06T 2207/30201; G06T 2207/30242
USPC .................................. 40/368–370, 591–593
See application file for complete search history.

(56) References Cited

U.S. PATENT DOCUMENTS

| | | | |
|---|---|---|---|
| 6,204,906 B1 | 3/2001 | Tannas, Jr. | |
| 8,096,069 B2* | 1/2012 | Ishikawa | G09F 21/045 345/204 |
| 2002/0015009 A1* | 2/2002 | Davis | G08G 1/09 345/39 |
| 2005/0258135 A1* | 11/2005 | Ishikawa | C03B 33/023 216/24 |
| 2007/0247800 A1* | 10/2007 | Smith | B60R 11/0252 361/679.02 |
| 2010/0036717 A1* | 2/2010 | Trest | G06Q 30/0207 705/14.1 |
| 2011/0225859 A1 | 9/2011 | Safavi | |

* cited by examiner

*Primary Examiner* — Stephen G Sherman

(57) ABSTRACT

The invention is system for displaying contiguous, ultra-wide, digital information in automated transportation systems both in vehicles and stations. The invention is meant to replace LED matrix signs in said automated transportation systems, displaying existing functional messages while adding full color images and videos for dynamic content and advertising delivery without the need to modify the existing mechanical, electrical communication infrastructure where applicable.

18 Claims, 8 Drawing Sheets

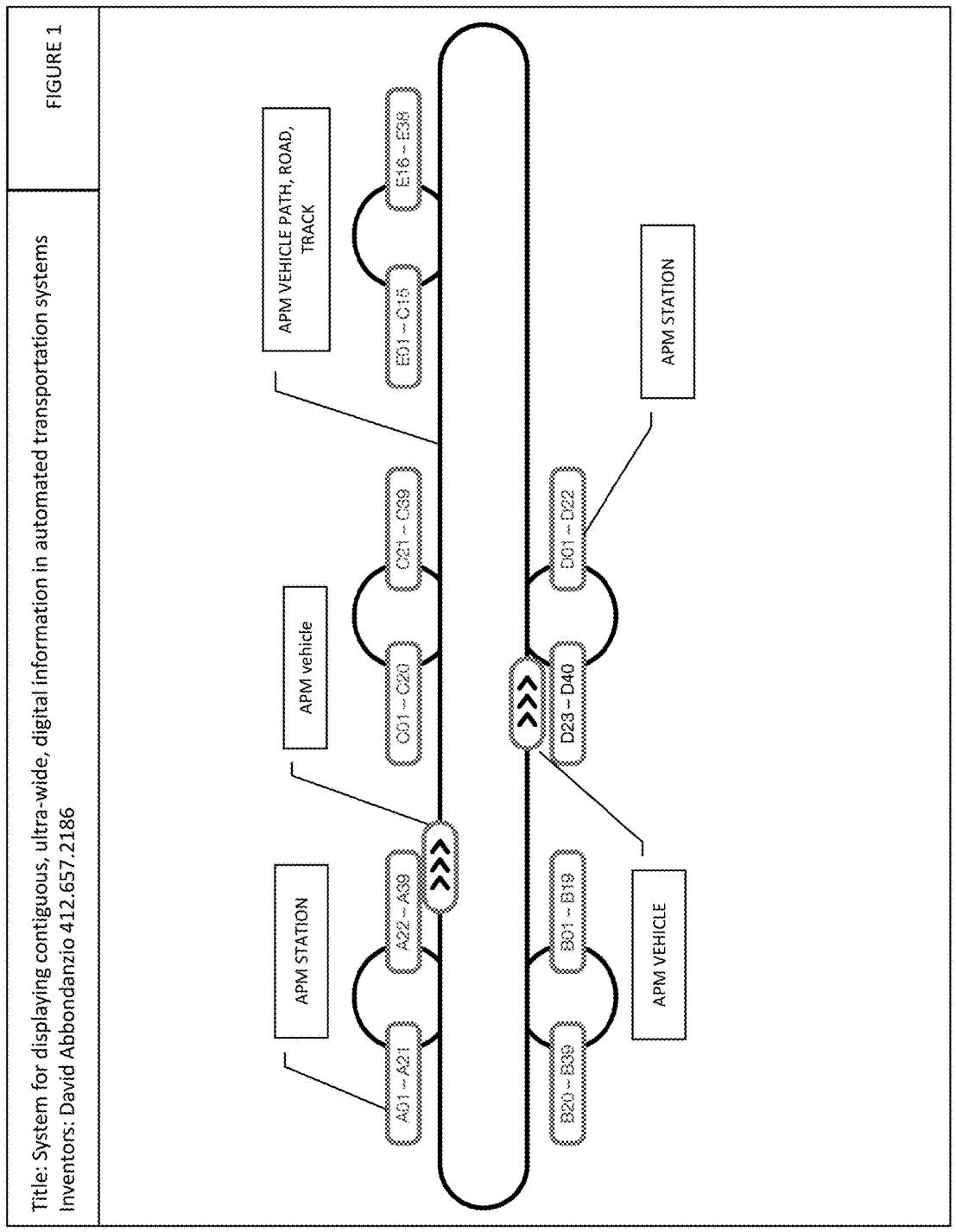

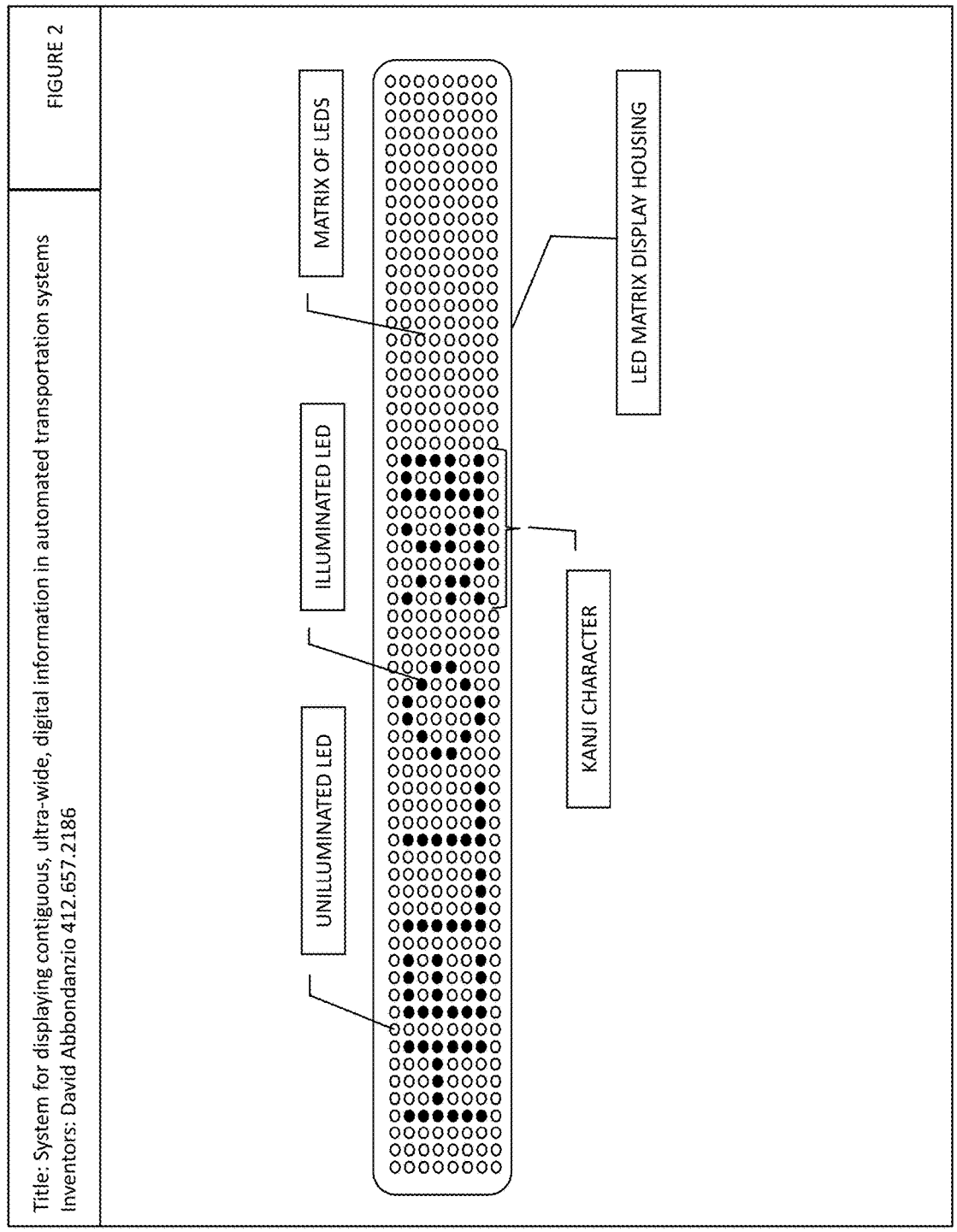

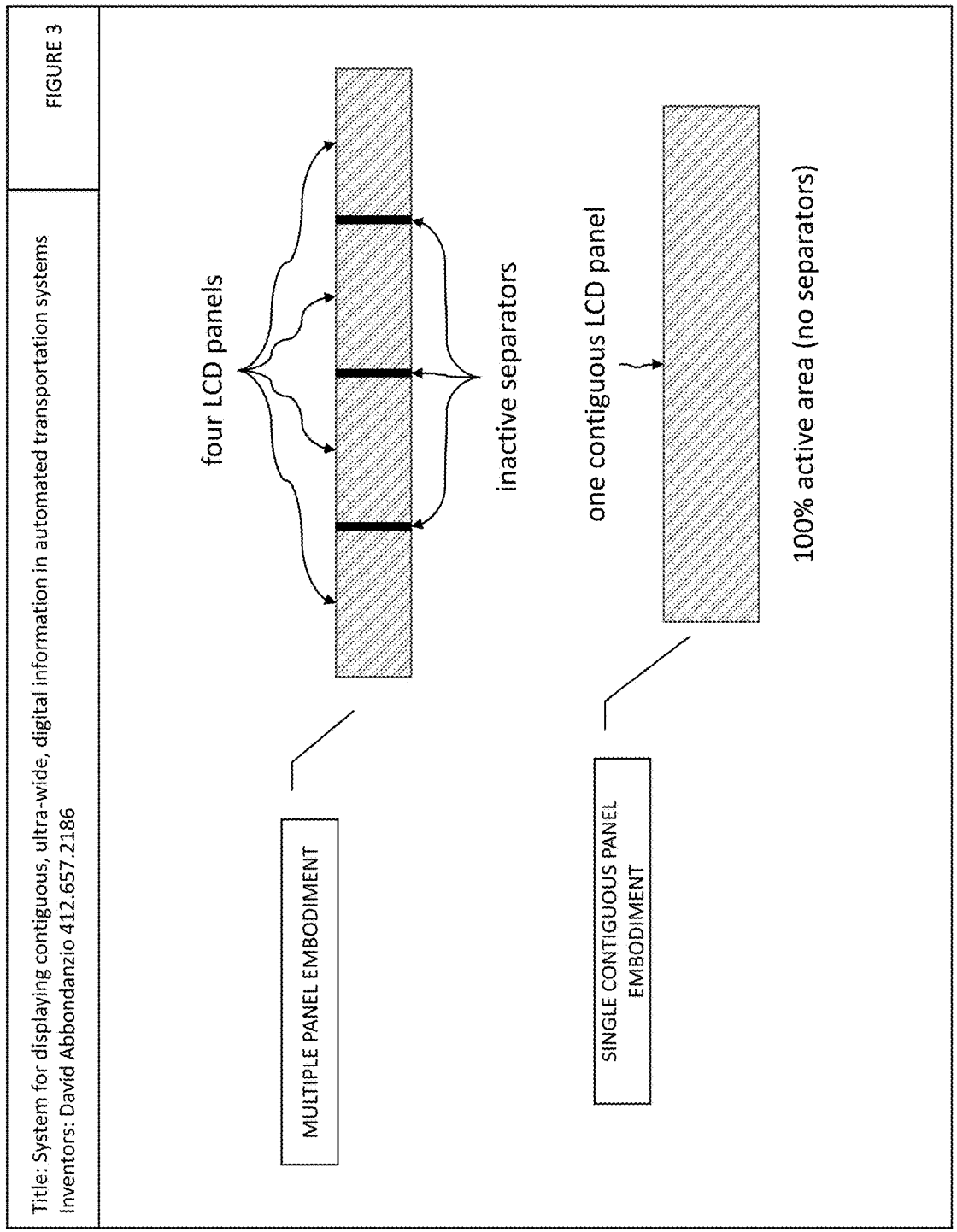

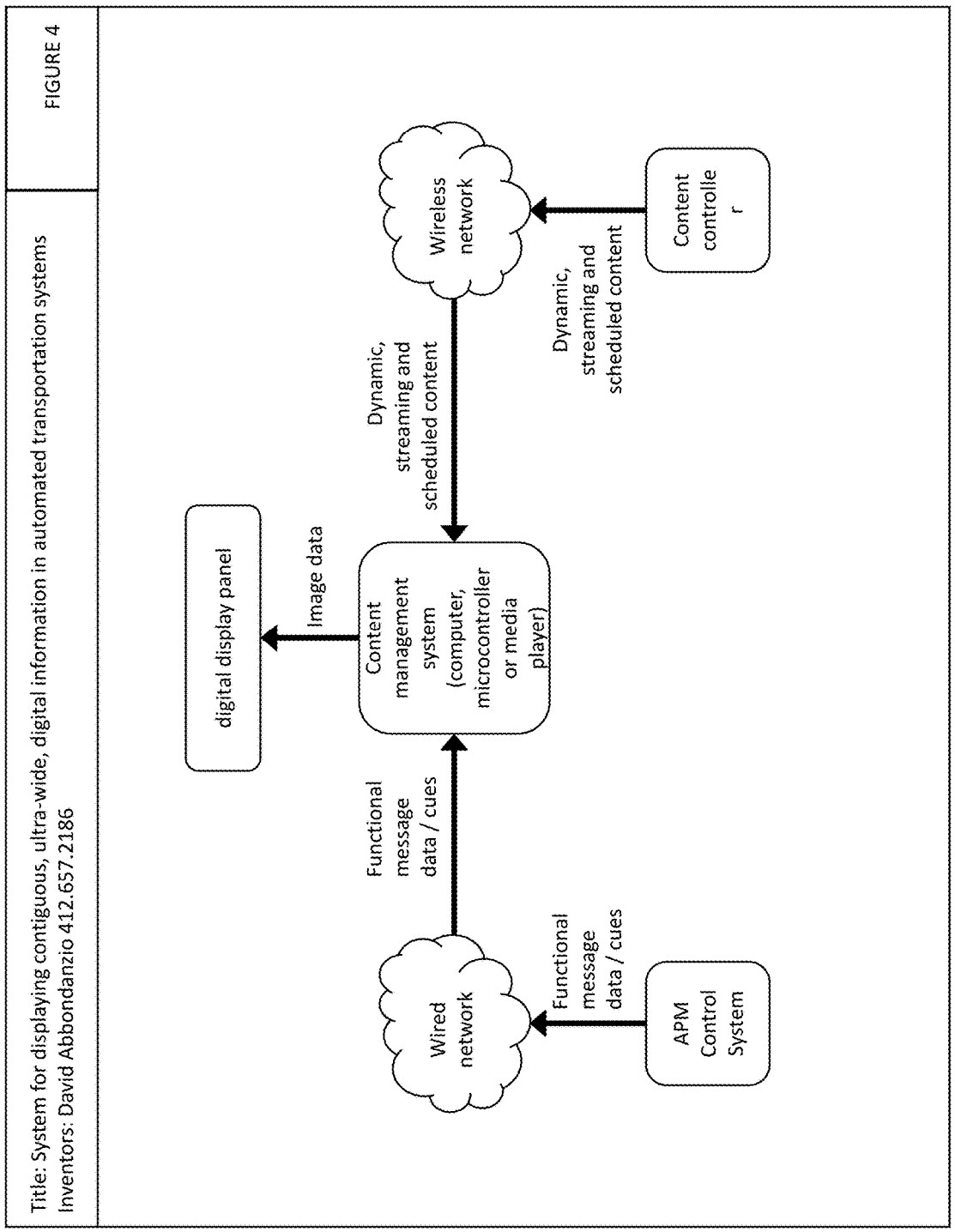

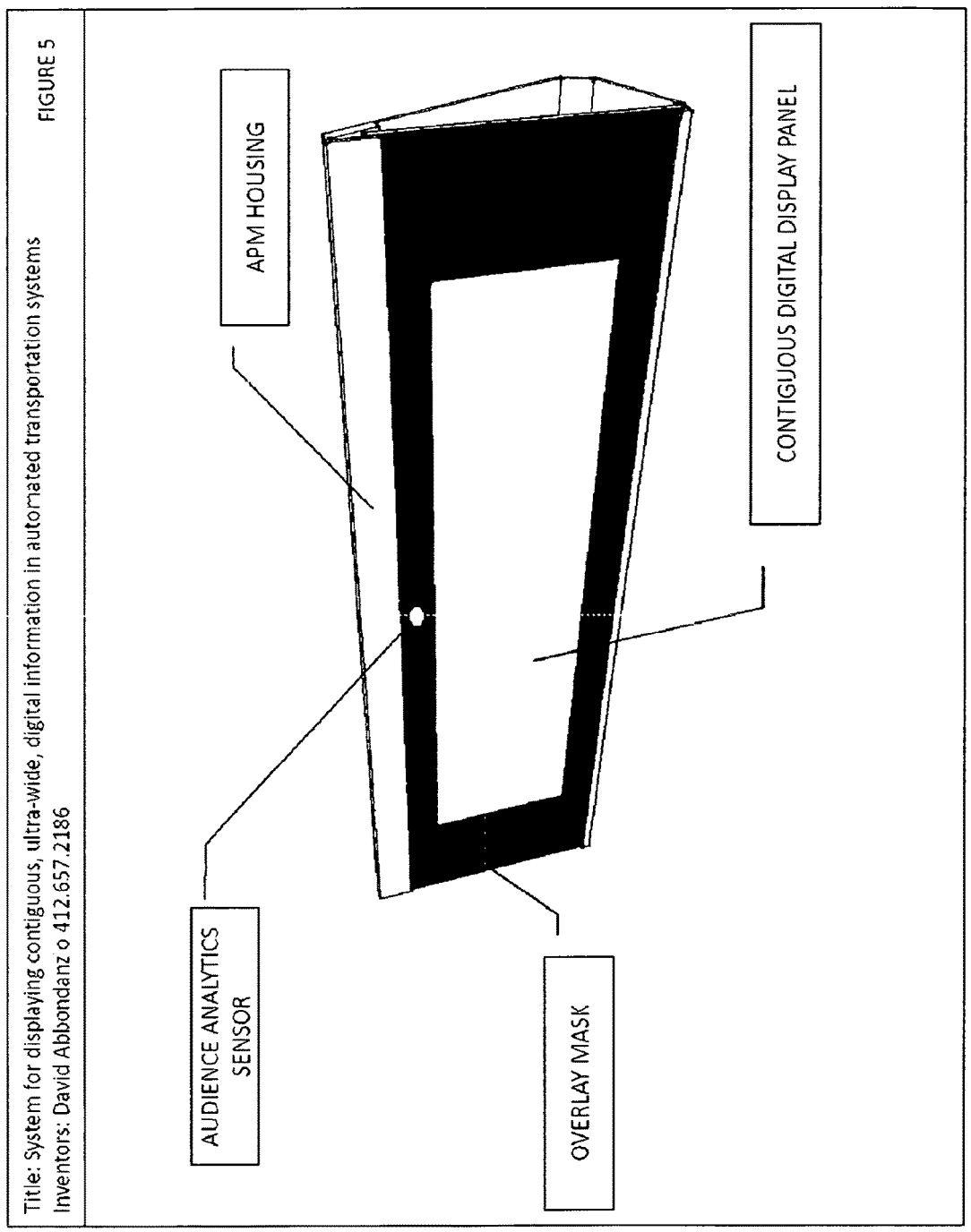

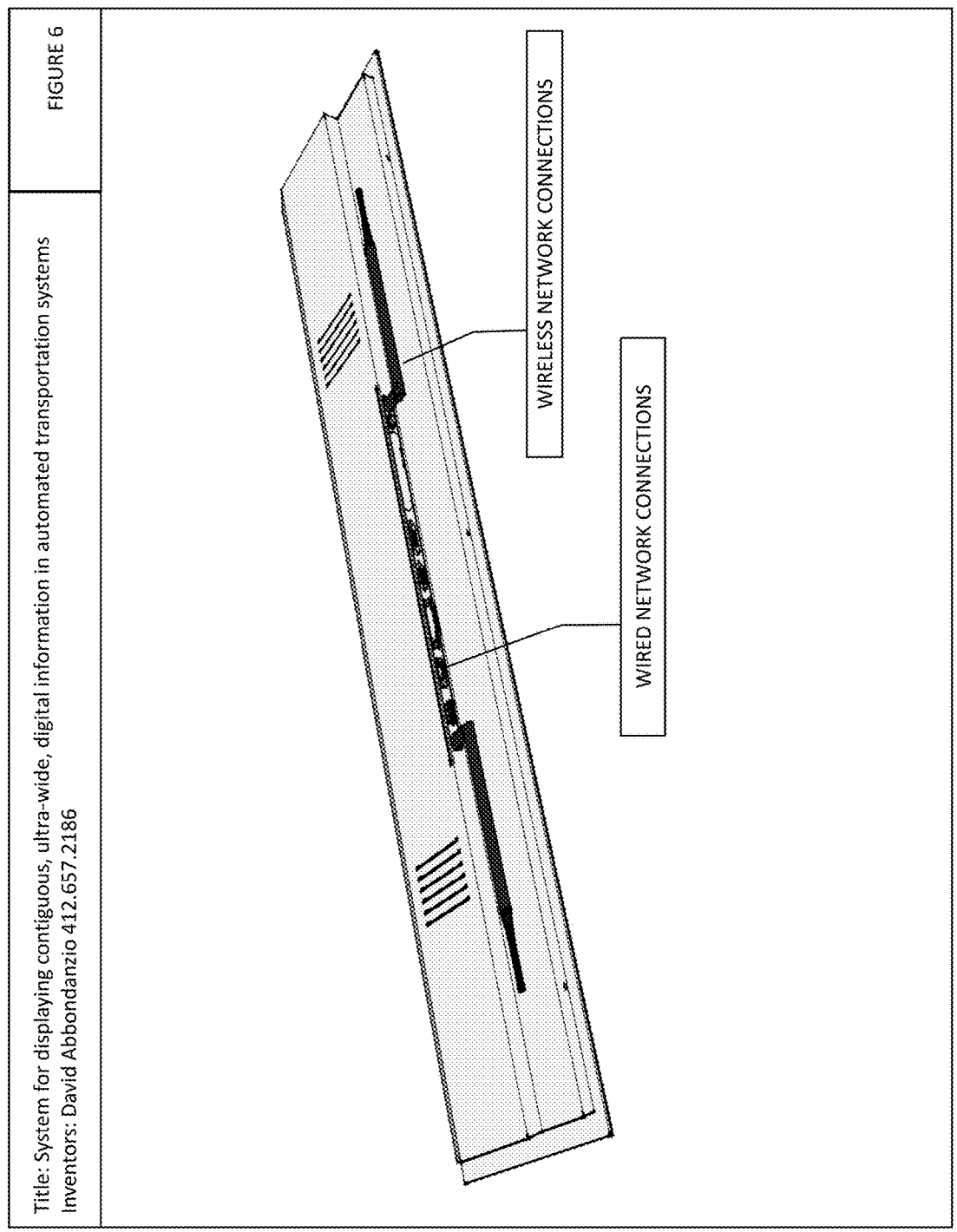

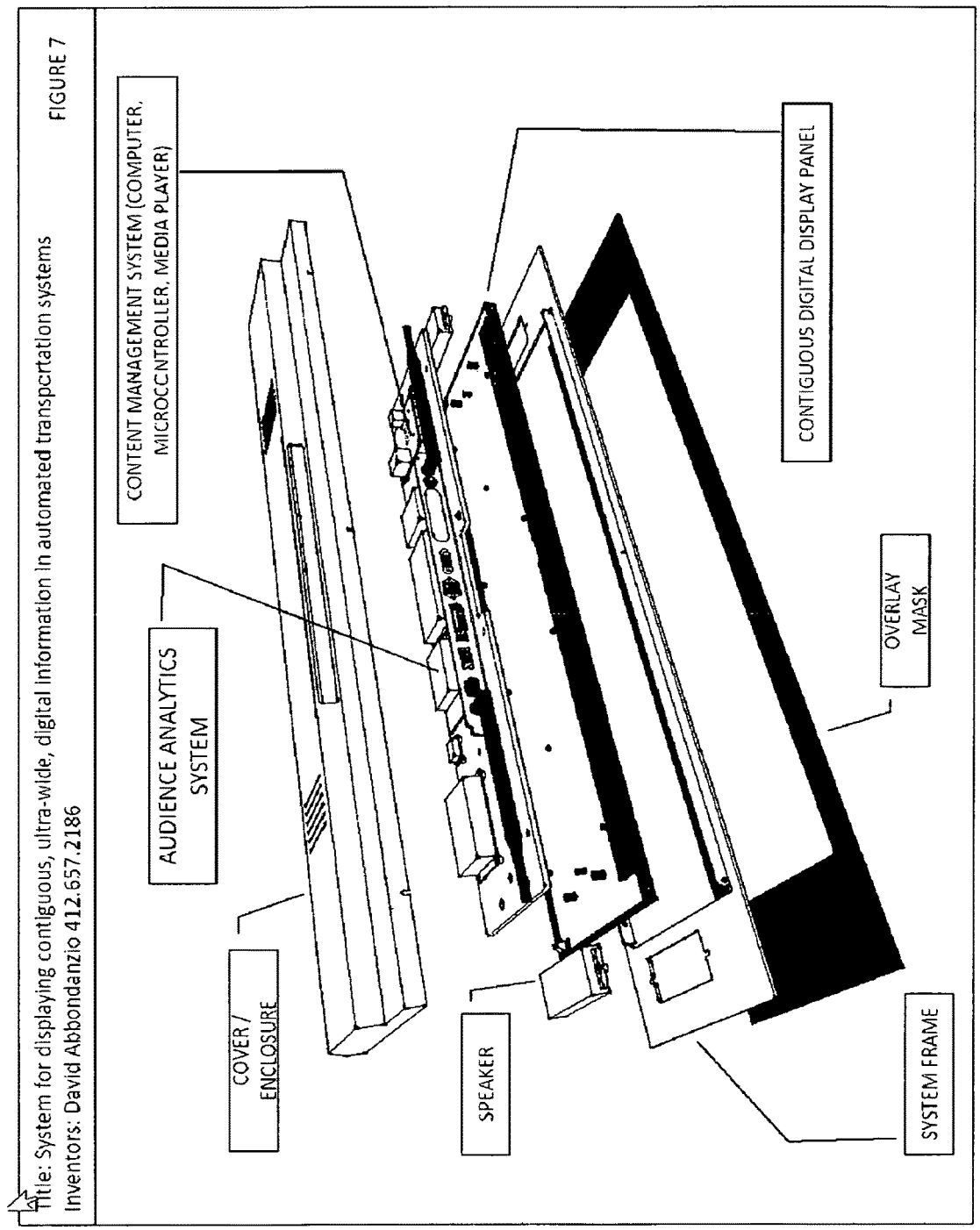

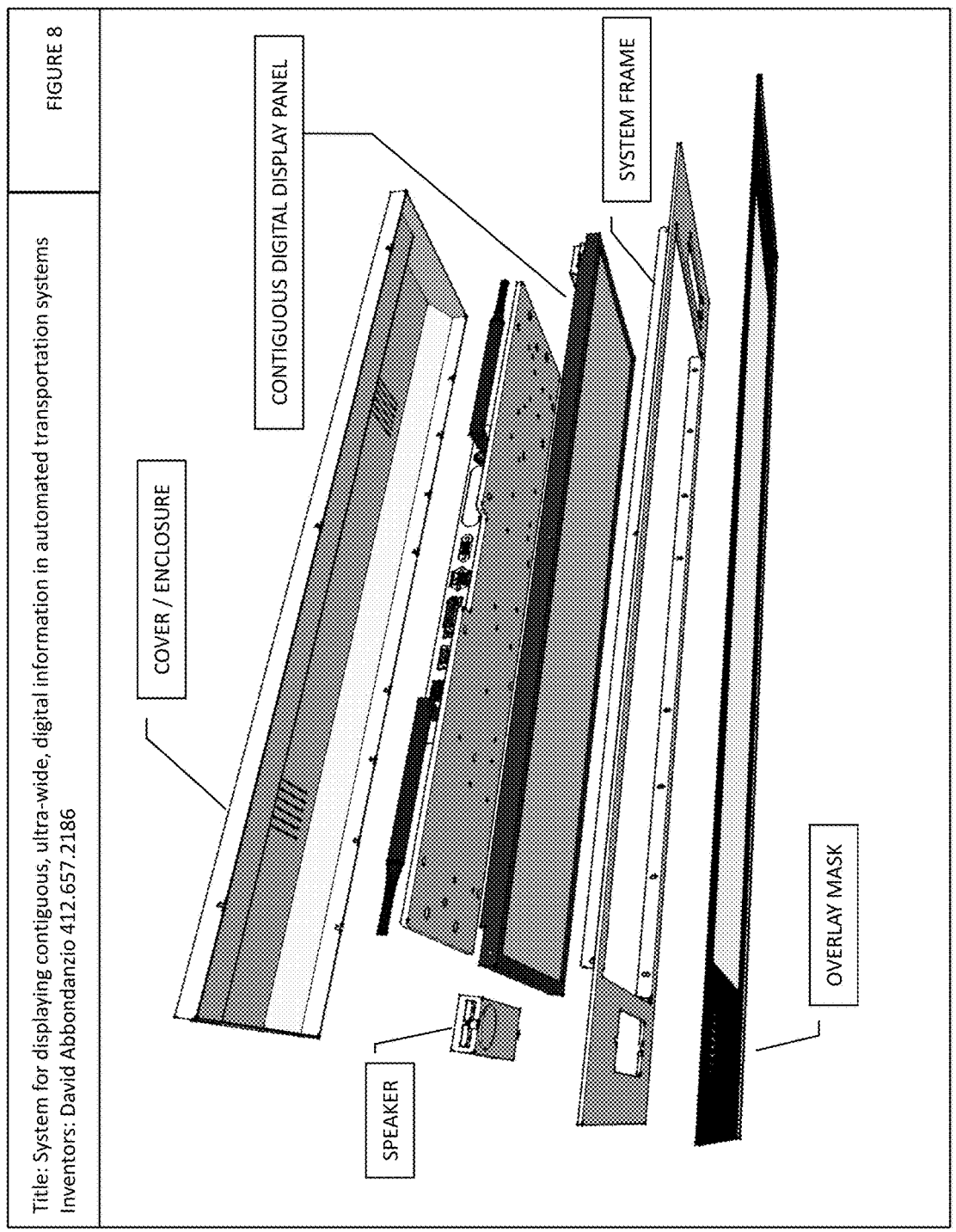

SYSTEM FOR DISPLAYING CONTIGUOUS, ULTRA-WIDE, DIGITAL INFORMATION IN AUTOMATED TRANSPORTATION SYSTEMS

This application claims benefit of provisional application, No. 62/417,105 filed on Nov. 3, 2016.

BACKGROUND OF INVENTION

Transportation systems are becoming increasingly more automated, self-driven or otherwise operated without the need for regular human intervention. Many systems exist today in the form of Automated People Movers (APMs)—train-like systems that operate within in defined circuits or paths at regular intervals to transport passengers from place to place. At airports, APMs are a critical component of a passenger's journey from terminal to terminal transporting passengers from one area of the airport to another in the fraction of the time that it may take to walk between the same two points.

Automated transportation systems are typically comprised of multiple vehicles traveling different directions between multiple stations at different fixed locations. As passengers attempt to navigate these sometimes, complicated systems, audible and visual cues and information may appear both within vehicles and stations to aid passengers in their journey. Information may consist of simple messages such as "Next Train Approaching", "Next Stop, Terminal A", "Doors Closing", etc. and is usually generated by the automated control system. (FIG. 1.)

Given the unique construction of the vehicles and stations, limited space is available for traditional digital signage which is of the standard 3:2, 4:3,5:3,5:4,7:5 and 16:9 aspect ratios. To accommodate this unique space limitation, LED matrix displays are typically incorporated. These types of displays consist of a matrix of individual LEDs of single or multiple colors spaced evenly to provide a method to form letters words and limited resolution images. Since these signs are made up of discreet LEDs, panels of ultra-wide aspect ratios may be constructed to fit the unique constraints of APMs. Although useful, LED matrix-style signs cannot display high resolution, full color images and video. When presenting information in international languages, many characters such as Kanji-based text are poorly rendered and hard to read. (FIG. 2.)

Liquid Crystal Displays (LCDs) are a better solution for displaying full-color graphical information including, images, video and high-resolution language characters such as kanji-based symbols. The problem with implementing standard LCD panels to replace the LED matrix style systems is that this would require multiple 16:9 ratio panels strung together in a row to provide the same or similar display area. Although this method provides higher resolution, full color and video capabilities it also results in dead space between panels and a more complicated information management system. By placing two or more LCD panels side by side there are physical constraints of the LCD panel that require control signals and mechanical fixation of the LCD stack up that does not allow the pixels on the edge of one panel to be placed next to the edge pixels on another panel with an inter-pixel distance less than or equal the regular pixel pitch of either panel. This larger spacing between edge pixels creates a visual separation (or separations) within the overall panel. (FIG. 3.)

SUMMARY OF THE INVENTION

The invention is system for displaying contiguous, ultra-wide, digital information in automated transportation systems both in vehicles and stations. The invention is meant to replace LED matrix signs in said automated transportation systems, displaying existing functional messages while adding full color images and videos for dynamic content and advertising delivery without the need to modify the existing mechanical, electrical communication infrastructure where applicable. (FIG. 4.)

BRIEF DESCRIPTION OF THE DRAWINGS

FIG. 1. is a high-level drawing of an example of an automated transportation system showing multiple vehicles traveling in multiple directions on a fixed path carrying passengers between multiple stations.

FIG. 2. is a drawing of an LED (light emitting diode) matrix display with individual LED's illuminated and uni-lluminated to display roman and Asian characters with a limited number of "dots" or "pixels." These types of signs are advantageous since they can be created in ultra-wide aspect ratios to fit unique spaces above doors and windows between these structure features and walls and ceilings.

FIG. 3. is an illustration of two embodiments of an LCD-based digital sign to achieve an ultra-wide aspect ratio greater than 16:9. The Multiple Panel Embodiment must comprise "dead zones" of inactive areas with no working pixels. These "dead zones" break up any contiguous image and create distractions to viewers. The Single Contiguous Panel Embodiment comprises no "dead zones" or inactive pixels within the overall display area.

FIG. 4. is a system level design drawing and data flow diagram of the invention showing content and functional messaging data flowing from wireless and wired network connections to the content management system (computer, microcontroller or media player) and final image data from the content management system to the digital display panel.

FIG. 5. is a drawing of an example of the invention system integrated into the automated transportation system housing with hidden or visible audience analytics sensor.

FIG. 6. is a drawing of the back of the invention showing the enclosed system with wired and wireless connections accessible.

FIG. 7. is an exploded view of the invention system showing the subcomponents including the overlay with mask, system frame, contiguous digital display panel, speakers, content management system, audience analytics system and back cover or enclosure.

FIG. 8. is an exploded view of the invention system showing the subcomponents including the overlay with mask, system frame, contiguous digital display panel, speakers and back cover or enclosure.

DETAILED DESCRIPTION OF THE INVENTION

To provide high-resolution, full-color information within the limited space requirements of APM systems without dead zones, as described previously, this invention proposes a system comprised of a contiguous digital display with aspect ratio greater than 16:9; a computer, microcontroller or media player to manage and display content to appear on the digital display; and wired or wireless data connections to a network or networks. Working in unison this system will display functional messages from the APM control system and other content including, emergency information, way-finding, flight information (FIDS), weather, video and advertising. This system will be mounted, installed or otherwise integrated within APM vehicles or stations. (FIG. 4.)

The contiguous digital display panel (FIGS. 5, 7 and 8) may be comprised of liquid crystal (LCD), organic light emitting diodes (OLED) or electronic ink technologies. This panel will be enclosed in a housing (FIGS. 1 and 8) that will aid in both its installation, function and aesthetic form. A masked overlay (FIGS. 7 and 8) may be applied to the front of said digital display panel to protect the panel from damage and mask off mechanical features and active or inactive areas of the display. The digital display panel will have an aspect ratio greater than 16:9 so that it may fit into areas where LED matrix signs (FIG. 2) currently reside. To achieve this greater than 16:9 aspect ratio without inactive areas or dead zones within the active area, the display panel may be natively sized or derived from a donor panel which is cut or otherwise modified to achieve this greater than 16:9 aspect ratio. Furthermore, typical digital displays are not viewable in bright light having maximum brightness capabilities of 400NIT or less. To accomplish better reading in bright ambient light, which is prevalent in transportation system environments, this ultrawide digital display panel will have the capability to produce images with a brightness greater than 400NIT.

It may be helpful to understand the audience of a digital display panel. Identifying the type of viewer and sometimes specifically who is viewing the digital display panel and when they are viewing it provides valuable information to the effectiveness of the content. This information can be used to alter the content to provide targeted information and advertising and helps increase the value of the content being displayed. For instance, knowing when a specific traveler is viewing the display and where they are traveling may improve the passenger experience by providing specific wayfinding information tailored to their trip or provide advertising for products and services along their journey. Sometimes, identifying just the gross characteristics of the audience such as age, gender or aggregated metadata such as search history and shopping history is helpful to provide feedback as to the effectiveness of the content. The content may be catered to the user to improve passenger experience and grow revenue. In order to provide this feedback about the audience, the digital display panel may comprise an audience analytics system (FIGS. 5 and 7). This system will detect characteristics of the viewers or audience of the display panel through sensors (FIG. 5) and methods that someone skilled in the art of audience detection and analytics would understand how to accomplish and does not need to be detailed herein this specification or in the drawings.

The content to be displayed on the digital display panel will be controlled by a content management system comprised of a computer, microcontroller or media player. This system will directly feed image data to the digital display panel while receiving content to be displayed and content cues from wired and/or wireless networks. (FIG. 4) Content may be streamed live or cached ahead of time to be displayed at specific times or when the APM vehicle is located at a specific location. Media such as wayfinding, flight, advertising and other informational images and video may be presented along with APM-specific functional messaging such as "now approaching terminal A", etc. Functional messages may be triggered or cued by the APM system over wired or wireless communication connections. Some embodiments of this APM connection may be implemented over a RS232, RS485, Parallel or Ethernet wired connections (FIG. 6). The content management system may display the raw data or use a translation table to display more appropriate information to passengers.

I claim:

1. A digital sign used in transportation systems comprised of a housing comprising:
    a contiguous digital display with ultrawide aspect ratio greater than 16:9 without dead zones or inactive areas;
    a content management system that directly feeds content to the display wherein the content may be streamed live or cached ahead of time for display at scheduled or asynchronous events;
    and wired or wireless data connections to a singular network or multiple networks to receive the content.

2. The contiguous digital display in claim 1 comprised of an LCD panel which is natively sized.

3. The contiguous digital display in claim 1 comprised of an LCD panel which is cut, resized or otherwise modified from a larger LCD panel.

4. The contiguous digital display in claim 1 comprised of an OLED panel which is natively sized.

5. The contiguous digital display in claim 1 comprised of an OLED panel which is cut, resized or otherwise modified from a larger OLED panel.

6. The contiguous digital display in claim 1 comprised of an electronic ink panel which is natively sized.

7. The contiguous digital display in claim 1 comprised of an electronic ink panel which is cut, resized or otherwise modified from a larger electronic ink panel.

8. The contiguous digital display in claim 1 with potential brightness capabilities of 400NIT or more.

9. The automated transportation system in claim 1 consisting of vehicles, stations and controls.

10. The content management system claim 1 which is comprised of a computer system microcontroller or media player.

11. The content management system claim 1 which is connected to the digital display.

12. The content management system claim 1 which is connected to wired or wireless network.

13. The digital sign in claim 1 which displays a dynamic map of the automated transportation system in claim 1.

14. The digital sign in claim 1 integrated, combined or installed within the transportation system vehicles.

15. The digital sign in claim 1 integrated, combined or installed within the transportation system stations.

16. The digital sign in claim 1 comprising speakers.

17. The digital sign in claim 1 comprising an audience analytics system.

18. The audience analytics system in claim 17 which:
    Detects unique human faces or;
    Counts unique human faces or;
    Detects or otherwise infers human gender or;
    Detects or otherwise infers human height.

* * * * *